(12) United States Patent
Schwab

(10) Patent No.: US 6,695,396 B1
(45) Date of Patent: Feb. 24, 2004

(54) ADJUSTABLE FASTENER ASSEMBLY

(75) Inventor: Leo Francis Schwab, Fraser, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/286,014

(22) Filed: Nov. 1, 2002

(51) Int. Cl.$^7$ ................................................. B60J 7/00
(52) U.S. Cl. ............... 296/203.02; 296/29; 296/193.09; 362/549; 362/528; 362/287
(58) Field of Search ............................. 296/203.02, 29, 296/193.09; 362/549, 528, 287, 306, 226, 273, 421, 523; 224/321, 309, 524

(56) References Cited

U.S. PATENT DOCUMENTS

| | | | | |
|---|---|---|---|---|
| 2,744,999 A | * | 5/1956 | Aenejo | 362/549 |
| 4,188,655 A | * | 2/1980 | Tallon et al. | 362/549 |
| 4,264,944 A | * | 4/1981 | Deverrewaere | 362/544 |
| 4,475,148 A | * | 10/1984 | Tomforde | 362/549 |
| 4,503,486 A | * | 3/1985 | Makita | 362/549 |
| 4,554,617 A | * | 11/1985 | Tyler | 362/523 |
| 4,821,155 A | * | 4/1989 | Harting | 362/527 |
| 4,829,409 A | * | 5/1989 | Funkey | 296/193.09 |
| 4,907,134 A | * | 3/1990 | Mori | 362/549 |
| 4,947,306 A | * | 8/1990 | O'Shaughnessey | 362/528 |
| 4,984,910 A | * | 1/1991 | Cogno | 384/563 |
| 4,996,635 A | * | 2/1991 | Olsson et al. | 362/549 |
| 5,651,604 A | * | 7/1997 | Dobler et al. | 362/549 |
| 5,865,500 A | * | 2/1999 | Sanada et al. | 296/193.1 |
| 5,876,084 A | * | 3/1999 | Smith et al. | 296/39.1 |
| 6,135,619 A | * | 10/2000 | Donaire Camacho et al. | 362/549 |
| 6,209,935 B1 | * | 4/2001 | Kavc et al. | 293/155 |
| 6,220,734 B1 | * | 4/2001 | Muller | 362/549 |
| 6,332,697 B2 | * | 12/2001 | Soga et al. | 362/549 |
| 6,357,821 B1 | * | 3/2002 | Maj et al. | 296/203.02 |
| 6,364,403 B1 | * | 4/2002 | Ozawa et al. | 296/203.02 |
| 6,450,676 B2 | * | 9/2002 | Maeda et al. | 362/549 |
| 6,471,386 B2 | * | 10/2002 | Oh | 362/549 |
| 6,523,886 B2 | * | 2/2003 | Hoffner et al. | 296/203.02 |
| 2002/0051366 A1 | * | 5/2002 | Oh | 362/549 |
| 2002/0075696 A1 | * | 6/2002 | Storck et al. | 362/549 |
| 2002/0117875 A1 | * | 8/2002 | Hoffner et al. | 296/194 |
| 2002/0118549 A1 | * | 8/2002 | Esser et al. | 362/549 |

FOREIGN PATENT DOCUMENTS

| | | | |
|---|---|---|---|
| DE | 3616694 | * | 11/1987 |
| JP | 64 18739 | * | 1/1989 |

* cited by examiner

*Primary Examiner*—Kiran Patel
(74) *Attorney, Agent, or Firm*—Laura C. Hargitt

(57) ABSTRACT

An adjustable fastener assembly for a vehicle includes a retainer for connection to a first vehicle part and a tab portion for connection to a second vehicle part to be received by the retainer. The adjustable fastener assembly also includes an adjustable mechanism between the tab portion and the retainer to act as a temporary holding device to prevent the tab portion from exiting the retainer after a position of the first vehicle part and the second vehicle part are set to a desired location relative to each other.

9 Claims, 4 Drawing Sheets

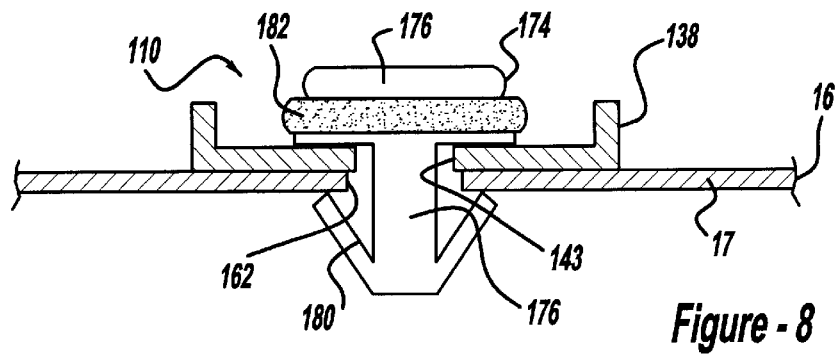
Figure - 8
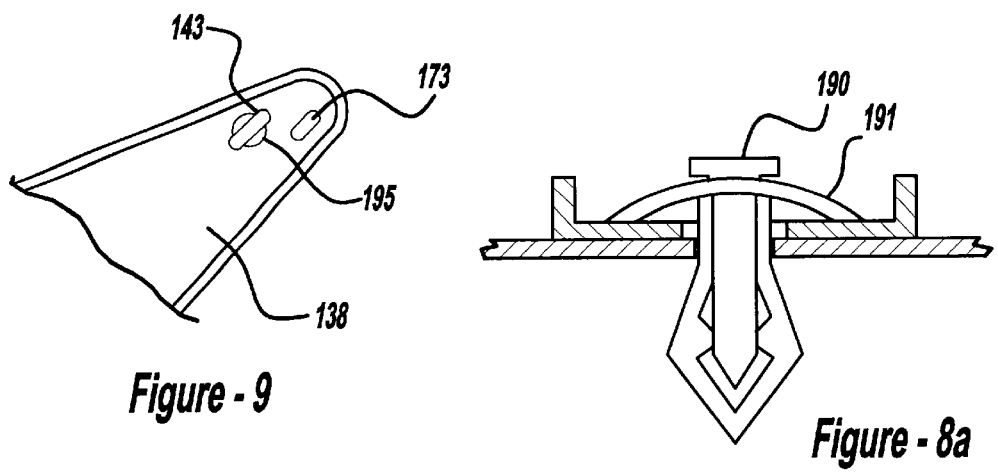
Figure - 9
Figure - 8a
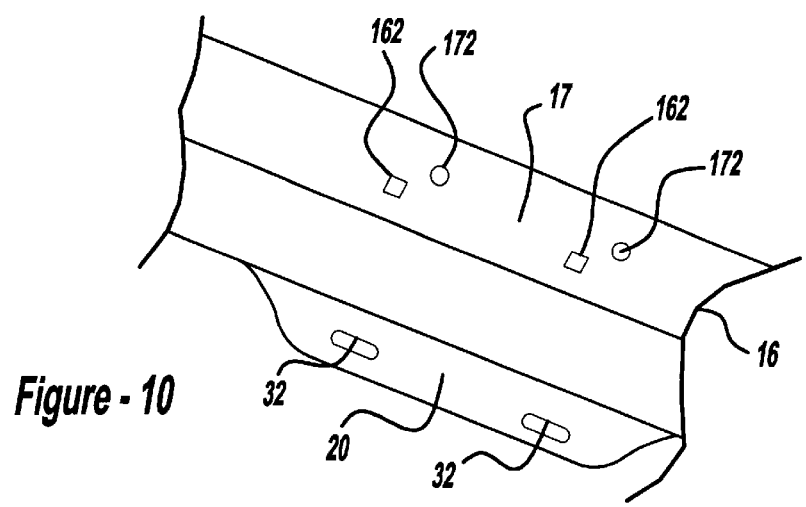
Figure - 10

ADJUSTABLE FASTENER ASSEMBLY

TECHNICAL FIELD

The present invention relates generally to fasteners and, more particularly, to an adjustable fastener assembly for a vehicle.

BACKGROUND OF THE INVENTION

It is known to provide a vehicle body for a vehicle such as a motor vehicle. Typically, the vehicle body includes a tie bar at a forward end and a hood overlapping the tie bar. It is also known to provide a headlamp assembly for the vehicle. Typically, the headlamp assembly has a housing and at least one headlamp light source disposed therein. The housing is typically attached to the tie bar by conventional fasteners such as screws.

It is further known that headlamp assemblies typically require adjustment to minimize a gap between the headlamp assembly and the hood of the vehicle body to improve a fit and finish of the vehicle. Typically, a fastener is loosened and the headlamp assembly is adjusted manually by hand to close the gap, which is known as a loose torque bolt method. For high volume vehicle production, conventional loose torque bolt methods are unacceptable.

Newer vehicles being manufactured have a trapped hood to the fascia and/or headlamp assembly. One problem with the trapped hood is that the fasteners cannot be accessed while the hood is closed. One attempt to overcome this problem is to use a fixture that locates off the tie bar to set the headlamp assembly, but the variation associated with the fixture is too large to meet design requirements.

As a result, it is desirable to provide an adjustable fastener to adjust a gap of a headlamp assembly or fascia to a hood of a vehicle body of a vehicle. It is also desirable to provide a fastener assembly that allows efficient hand adjustment of a headlamp assembly for a vehicle. It is further desirable to provide a fastener assembly that provides a temporary attachment while a hood of a vehicle body is closed. Therefore, there is a need in the art to provide an adjustable fastener assembly for a vehicle that meets these desires.

SUMMARY OF THE INVENTION

It is, therefore, one object of the present invention to provide a new adjustable fastener assembly for a vehicle.

It is another object of the present invention to provide an adjustable fastener assembly for a vehicle that provides a temporary attachment while a hood of a vehicle body is closed to adjust a gap between a headlamp assembly or fascia and the hood.

To achieve the foregoing objects, the present invention is an adjustable fastener assembly for a vehicle. The adjustable fastener assembly includes a retainer for connection to a first vehicle part and a tab portion for connection to a second vehicle part to be received by the retainer. The adjustable fastener assembly also includes an adjustable mechanism between the tab portion and the retainer to act as a temporary holding device to prevent the tab portion from exiting the retainer after a position of the first vehicle part and the second vehicle part are set to a desired location relative to each other.

One advantage of the present invention is that an adjustable fastener assembly is provided for a vehicle to allow a headlamp assembly or fascia to be adjusted to a hood of a vehicle to minimize a gap therebetween. Another advantage of the present invention is that the adjustable fastener assembly provides a temporary attachment while the hood is closed and, after the hood is opened, the final secure attachment can be made with a conventional bolt. Yet another advantage of the present invention is that the adjustable fastener assembly allows the ability to adjust the headlamp assembly to the hood such that a gap therebetween is three millimeters (3.0 mm) with a tolerance of plus or minus a half of millimeter (+/−0.5 mm), yielding a competitive advantage to a fit and finish of the vehicle. Still another advantage of the present invention is that the adjustable fastener assembly allows a friction-held preset between two or more parts as a temporary holding device and final fastening strength through conventional fasteners after the position of the parts is set to a desired location. A further advantage of the present invention is that the adjustable fastener assembly is used to set accurate gaps or flush conditions with low variation between two adjacent surfaces. Yet a further advantage of the present invention is that the adjustable fastener assembly is used to allow temporary positioning where conventional fastener access is inhibited.

Other objects, features, and advantages of the present invention will be readily appreciated, as the same becomes better understood, after reading the subsequent description taken in conjunction with the accompanying drawings.

BRIEF DESCRIPTION OF THE DRAWINGS

FIG. 8 is a fragmentary elevational view of another embodiment, according to the present invention, of the adjustable fastener assembly of FIG. 1.

FIG. 8A is a fragmentary elevational view of yet another embodiment, according to the present invention, of the adjustable fastener assembly of FIG. 1.

FIG. 9 is a partial perspective view of a portion of the adjustable fastener assembly of FIG. 8.

FIG. 10 is a partial perspective view of another portion of the adjustable fastener assembly of FIG. 8.

DESCRIPTION OF THE PREFERRED EMBODIMENT

Figure 1:
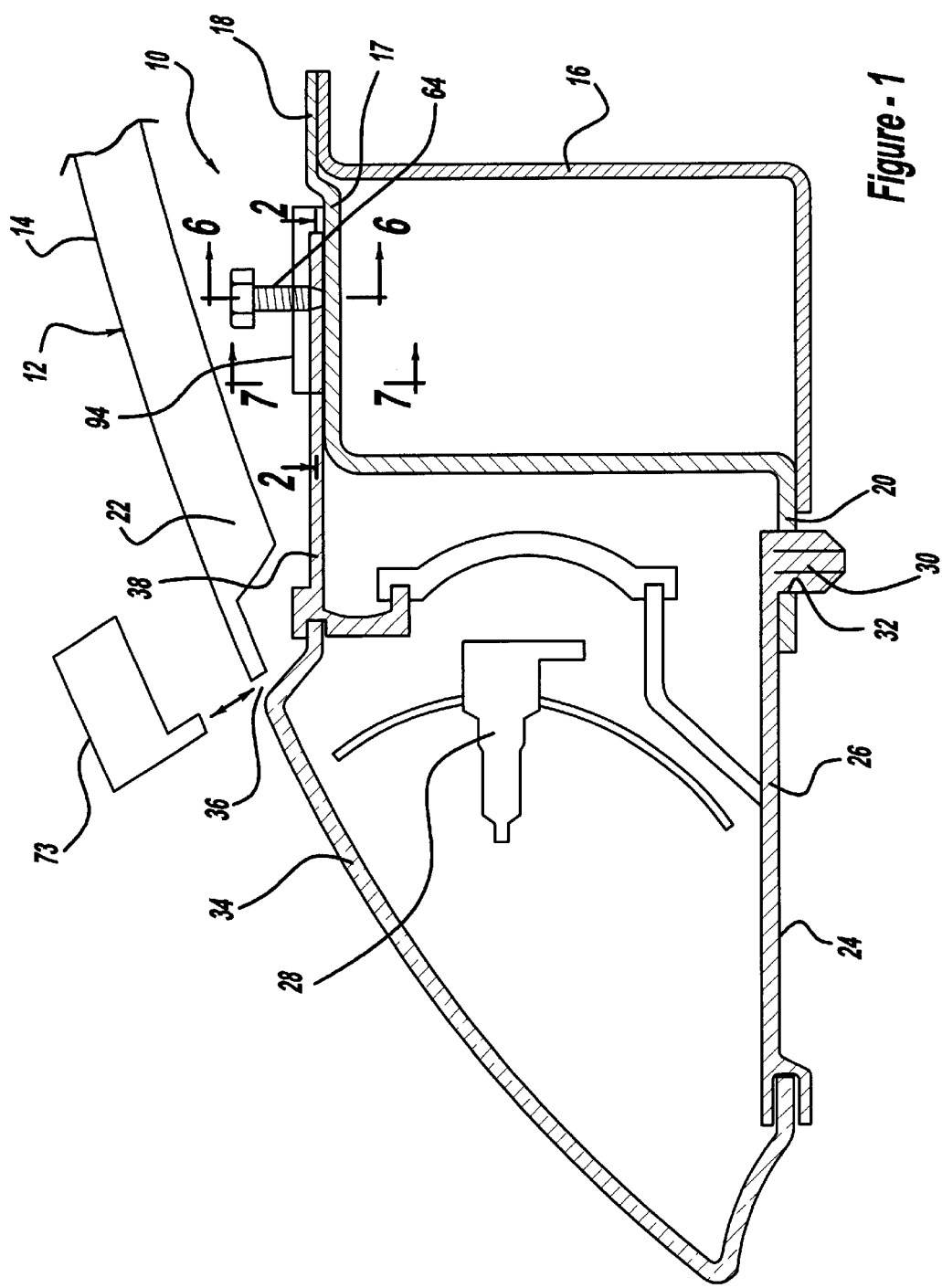
FIG. 1 is a fragmentary elevational view of an adjustable fastener assembly, according to the present invention, illustrated in operational relationship with a vehicle.
Figure 2:
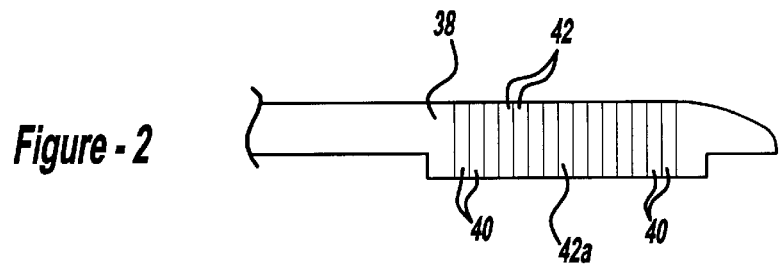
FIG. 2 is a sectional view taken along line 2—2 of FIG. 1.
Figure 3:
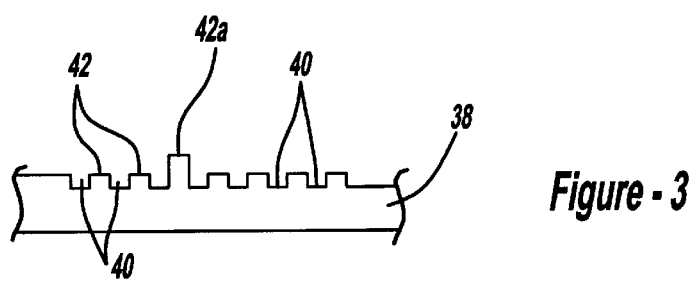
FIG. 3 is a plan view of a portion of the adjustable fastener assembly of FIG. 1.
Figure 4:
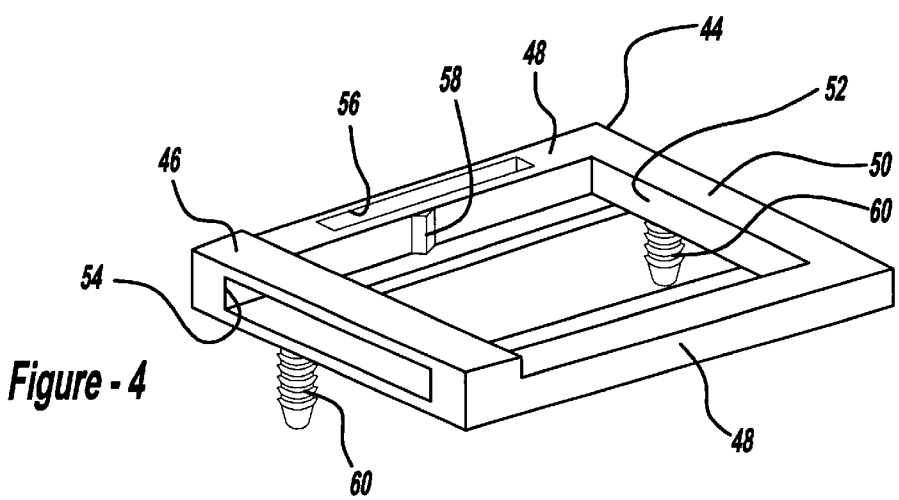
FIG. 4 is a perspective view of a retainer of the adjustable fastener assembly of FIG. 1.
Figure 5:
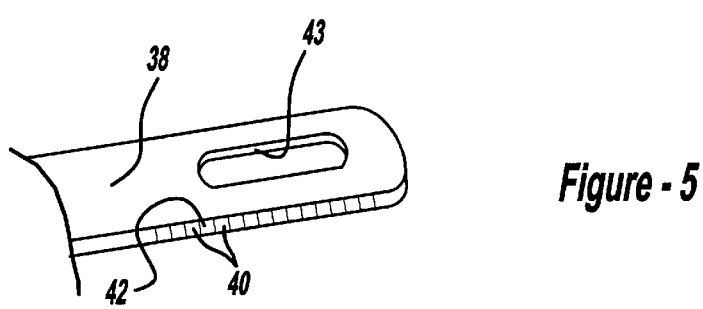
FIG. 5 is a perspective view of a portion of the adjustable fastener assembly of FIG. 1.
Figure 6:
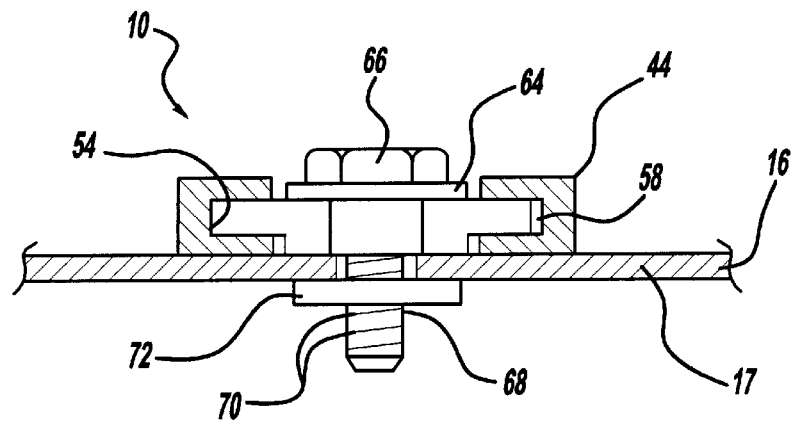
FIG. 6 is a sectional view taken along line 6—6 of FIG. 1.
Figure 7:
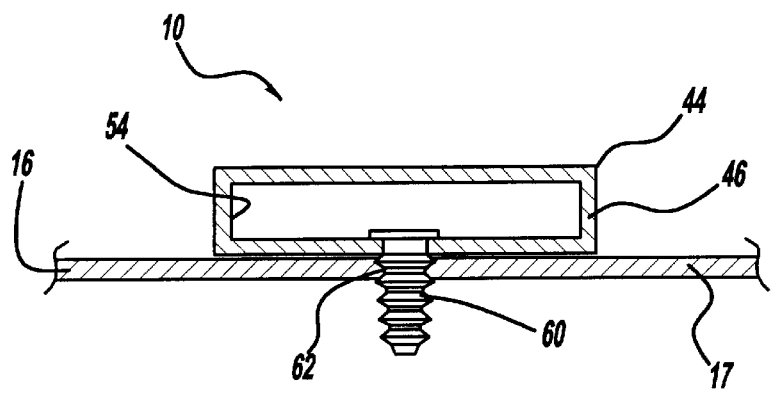
FIG. 7 is a sectional view taken along line 7—7 of FIG. 1.

Referring to the drawings and in particular FIG. 1, one embodiment of an adjustable fastener assembly 10, according to the present invention, is shown for a vehicle, generally indicated at 12. The vehicle 12 includes a vehicle body 14 having a tie bar 16 at a forward longitudinal end thereof. The tie bar 16 is a generally tubular member having a generally rectangular cross-sectional shape. The tie bar 16 has a top wall 17 with a rear flange 18 extending longitudinally rearward and a front flange 20 extending longitudinally forward from a lower portion thereof. The vehicle body 14 also has a hood 22 extending longitudinally forward and downwardly to overlap the tie bar 16. It should be appreciated that the hood 22 is spaced vertically from the tie bar 16 and extends longitudinally past the tie bar 16. It should also be appreciated that the tie bar 16 and hood 22 are conventional and known in the art.

The vehicle 12 also includes at least one headlamp assembly 24 at a forward longitudinal end of the vehicle body 14. The headlamp assembly 24 is a fixed lamp modular assembly having a plastic housing 26 and a headlamp light source 28 disposed in the housing 26 as one unit. The housing 26 has at least one projection or locator 30 on a bottom thereof to be received in at least one lower net locator aperture 32 extending through the front flange 20 of the tie bar 16. The locator 30 is of a pin type that is extended through the aperture 32 for the lower attachment of the headlamp assembly 24 to the tie bar 16. It should be appreciated that the locator 30 and locator aperture 32 could be replaced with a bolted joint where the flexibility of the bolted joint and the small amount of movement or variation is being reduced to allow for movement of the headlamp assembly 24 to a near nominal position.

The housing. 26 includes a lens portion 34 at a forward end thereof and having a generally arcuate shape. The upper end of the lens portion 34 forms a space or gap 36 with the forward longitudinal end of the hood 22. It should be appreciated that the gap 36 needs to be controlled where a net build condition does not provide adequate variation. It should also be appreciated that, in the embodiment of the headlamp assembly 24 to the hood 22, an expected variation from a net build condition is 2.7 mm, which far exceeds a desired 0.5 mm to produce an acceptable fit for parallel gap requirements.

Referring to FIGS. 1 through 3 and 5, the housing 26 also has at least one upper tab portion 38 extending rearwardly from the lens portion 34 and overlapping the top wall 17 of the tie bar 16. The upper tab portion 38 has at least one, preferably a plurality of vertical grooves or notches 40 in at least one side thereof forming at least one, preferably a plurality of ratcheting projections 42. One of the projections 42 extends outwardly a distance greater than the other projections 42 to be a prominent projection 42a that is inserted into a receiver or retainer 44 to be described of the adjustable fastener assembly 10. The prominent projection 42a provides enough force for an assembly operator (not shown) to easily find a first position of the assembly sequence, before the hood 22 is closed, and to make the final setting to the hood 22 once the hood 22 is closed. The upper tab portion 38 also has a slot 43 extending vertically therethrough to receive a fastener 64 to be described. It should be appreciated that the upper tab portion 38 is inserted into the retainer 44 to be described of the adjustable fastener assembly 10 to secure the headlamp assembly 24 to the tie bar 16 and minimize the gap 36. It should also be appreciated that the adjustable fastener assembly 10 may be used on a fascia support bracket (not shown) instead of the headlamp assembly 24 to set a fascia (not shown) to the hood 22 to minimize a gap therebetween. It should also be appreciated that, except for the adjustable fastener assembly 10, the vehicle 12 is conventional and known in the art.

Referring to FIGS. 1, 4, 6, and 7, the adjustable fastener assembly 10 includes at least one tab receiver or retainer 44. The retainer 44 is generally rectangular in shape and has a front wall 46, a pair of opposed side walls 48 extending generally perpendicularly from the front wall 46, and a rear wall 50 extending generally perpendicularly from the side walls 48 to form a hollow opening 52 therebetween. The retainer 44 also has a slot 54 extending longitudinally through the front wall 46 to communicate with the opening 52 and along the side walls 48. At least one of the side walls 48 has a slot 56 extending vertically therethrough and a projection 58 extending laterally into the opening 52. Preferably, the projection 58 has a generally triangular cross-sectional shape. The retainer 44 also has at least one, preferably a plurality of temporary fasteners 60 of a push-pin type extending vertically through the front wall 46 and rear wall 50. The temporary fasteners 60 are made of a rigid material such as plastic and molded-in to the retainer 44. The temporary fasteners 60 are to be received in upper net locator apertures 62 extending through the top wall 17 of the tie bar 16. The temporary fasteners 60 are of a Christmas tree type extended through the locator apertures 62 for attachment of the retainer 44 to the tie bar 16. The retainer 44 is made of a rigid material, preferably a plastic material. The retainer 44 is a monolithic structure being integral, unitary, and one-piece. It should be appreciated that the projection 58 on the retainer 44 cooperates with the projections 44 on the upper tab portion 38 and that the slot 56 in the side wall 48 provides a spring effect to allow the side wall 48 to deflect and return.

The adjustable fastener assembly 10 also includes at least one permanent fastener 64 to provide the final attachment of the headlamp assembly 24 to the tie bar 16. The permanent fastener 64 is of a bolt or screw type having a head 66 and a shaft 68 extending axially from the head 66 with a plurality of threads 70. The permanent fastener 64 is made of a rigid material, preferably a metal material. It should be appreciated that the permanent fastener 64 fastens the upper tab portion 38 directly to a surface of the tie bar 16 for optimum joint integrity. It should also be appreciated that a weld nut 72 may be disposed about the shaft 68 to prevent the permanent fastener 64 from exiting the tie bar 16. It should further be appreciated that the permanent fastener 64 is conventional and known in the art.

In operation, an assembly operator (not shown) installs the retainers 44 onto the tie bar 16 by inserting the temporary fasteners 60 into the locator apertures 62 of the tie bar 16. The headlamp assembly 24 is installed by the assembly operator inserting the locators 30 into the locator apertures 32 of the tie bar 16. The upper tab portions 38 of the housing 26 are inserted into the retainers 44. The headlamp assembly 24 is pushed toward the hood 22 until the first temporary projection 42 on the ratchet is felt. The hood 22 is closed and a gapping tool 73 (FIG. 1) such as a three-millimeter spacer block is placed between the headlamp assembly 24 and the hood 22. This gapping tool 73 may be part of a shipped-in headlamp assembly 24 and held on with tape or a breakaway plastic piece (not shown). The headlamp assembly 24 is pushed into the hood 22, squeezing the spacer block tight, and the projections 42 move past the projection 58. The adjustable fastener assembly 10 holds the headlamp assembly 24 in position and the hood 22 is opened. The permanent fasteners 64 are inserted into the slots 43 of the tab portions 38 and tightened into the tie bar 16. This secures the headlamp assembly 24 to the tie bar 16 and the assembly is complete. It should be appreciated that the engagement between the projections 42 and 58 provides a friction-held preset between the headlamp assembly 24 and hood 22 as a temporary holding device and final fastening strength is accomplished through the permanent fasteners 64 after the gap 36 is set to a desired amount. It should also be appreciated that the retainers 44 may be pre-assembled onto the upper tab portions 38 of the headlamp assembly 24 and pushed into the tie bar 16 using the temporary fasteners 60.

Referring to FIGS. 8 through 10, another embodiment, according to the present invention, of the adjustable fastener assembly 10 is shown. Like parts of the adjustable fastener assembly 10 have like reference numerals increased by one hundred (100). In this embodiment, the adjustable fastener assembly 110 eliminates the retainer and the tab portion 138 has a first slot 143 and a second slot 173 spaced from the first slot 143. The adjustable fastener assembly 110 includes a removable fastener 174 extending through the first slot 143 to temporarily secure the tab portion 138 to the top wall 17 of the tie bar 16. The removable fastener 174 is of a pushpin type and, in yet another embodiment, is similar to a scrivit 190 (FIG. 8A) that is used on fascias. The removable fastener 174 has a head 176 and a shaft 178 with a V shaped projection 180 at one end of the shaft 178. The removable fastener 174 is made of a rigid material, preferably a plastic material. It should be appreciated that the removable fastener 174 extends through the first slot 143 and the permanent fastener 64 extends through the second slot 173.

The adjustable fastener assembly 110 also includes a spring 182 disposed about the removable fastener 174. The spring 182 is made of a spring material, preferably an elastomeric material such as foam. The spring 182 is tuned by durometer and thickness to provide the desired frictional force to allow the headlamp assembly 24 to stay in place while the hood 22 is closed, the headlamp assembly 24 is adjusted, the hood 22 is opened, and the permanent fastener 64 is tightened. As illustrated in FIGS. 9 and 10, the configuration of the slots 143 and 173 on the upper tab portion 38 and the apertures 162 and 172 on the tie bar 16 is shown. It should be appreciated that the spring 182 provides a preload of the required force to allow hand movement without the part slipping under assembly vibration or loads. It should also be appreciated that a countersunk area 195 below the head of the removable fastener 174 provides a temporary stop needed prior to closing the hood 22. It should further be appreciated that this countersunk area located in the upper tab portion 138 is designed in such a way with a lead-in that the headlamp assembly 24 can be forced past the stop by the assembly operator with less than 10 lbs fore/aft force. It should still further be appreciated that, in yet another embodiment, a spring 191 can be formed into the head of the fastener 174 in the shape of an upside down bowl as illustrated in FIG. 8A.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An adjustable fastener assembly comprising:
   a retainer adapted for connection to a tie bar of the vehicle;
   a tab portion adapted for connection to a headlamp assembly to be received by said retainer; and
   an adjustable mechanism between said tab portion and said retainer to act as a temporary holding device to prevent said tab portion from exiting said retainer after a position of the headlamp assembly is set to a desired location relative to the tie bar.

2. An adjustable fastener assembly as set forth in claim 1 wherein said adjustable mechanism includes a plurality of first projections on said tab portion and at least one projection on said retainer.

3. An adjustable fastener assembly as set forth in claim 2 wherein one of said first projections extends outwardly a distance greater than a remainder of said first projections.

4. An adjustable fastener assembly as set forth in claim 1 wherein said tab portion includes a slot extending therethrough.

5. An adjustable fastener assembly as set forth in claim 4 including a permanent fastener extending through said slot of said tab portion for engagement with the tie bar.

6. An adjustable fastener assembly as set forth in claim 1 wherein said retainer includes at least one temporary fastener extending therefrom for engagement with the tie bar.

7. An adjust able fastener assembly as set forth in claim 2 wherein said retainer comprises a front wall, opposed side walls extending generally perpendicular from said front wall, and a rear wall extending generally perpendicular to said side walls to form an opening.

8. An adjustable fastener assembly as set forth in claim 7 wherein one of said side walls includes a projection extending into said opening and cooperating with said projections.

9. An adjustable fastener assembly as set forth in claim 8 wherein said side wall includes a slot extending through the one of said side walls.

* * * * *